Dec. 16, 1947.   J. C. AUTEN   2,432,711
TRANSMISSION CONTROL MECHANISM
Original Filed April 4, 1945    2 Sheets-Sheet 1
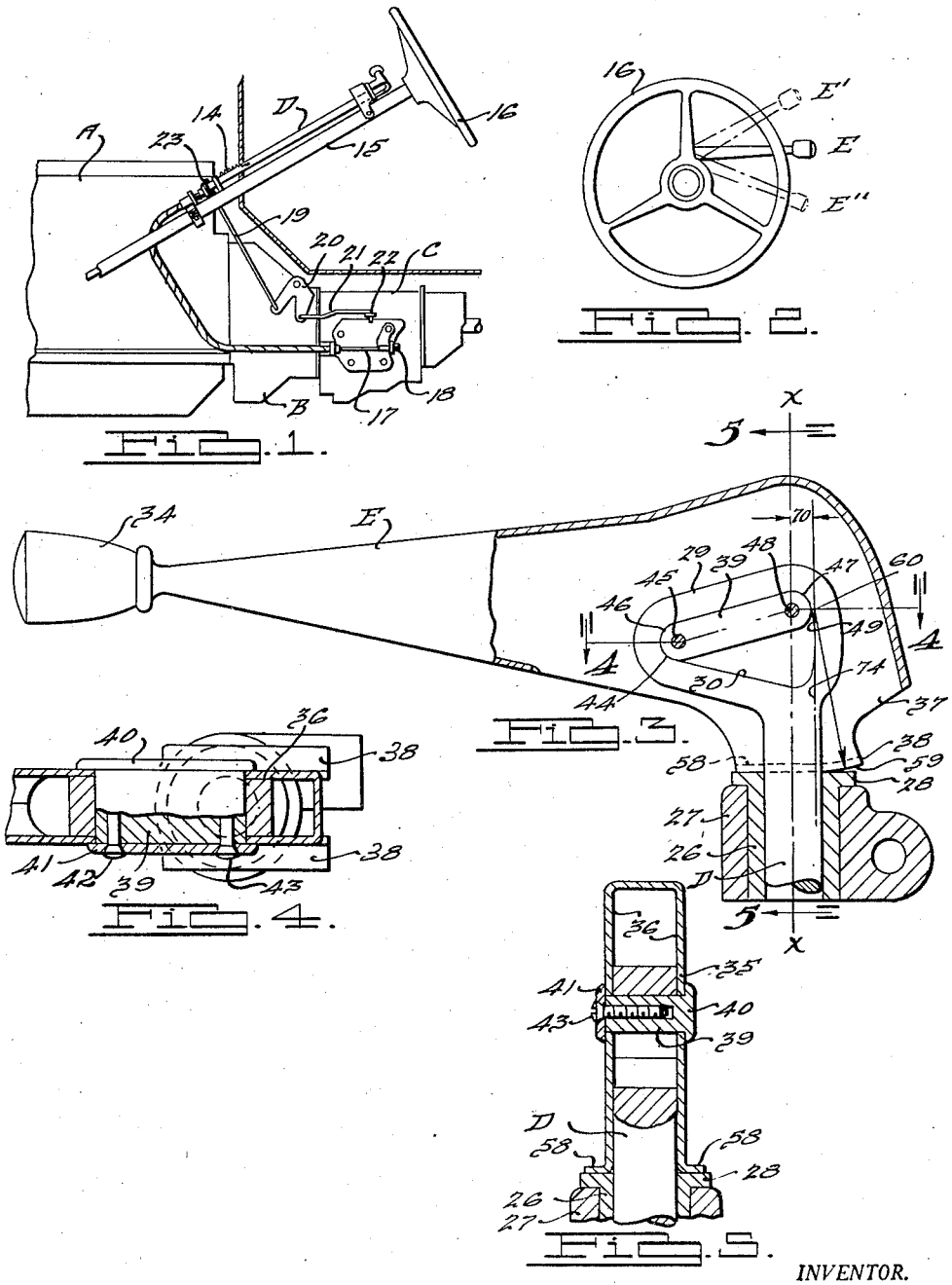
INVENTOR.
Jay C. Auten.
BY
Harness and Harris
ATTORNEYS Dec. 16, 1947. J. C. AUTEN 2,432,711
TRANSMISSION CONTROL MECHANISM
Original Filed April 4, 1945 2 Sheets-Sheet 2
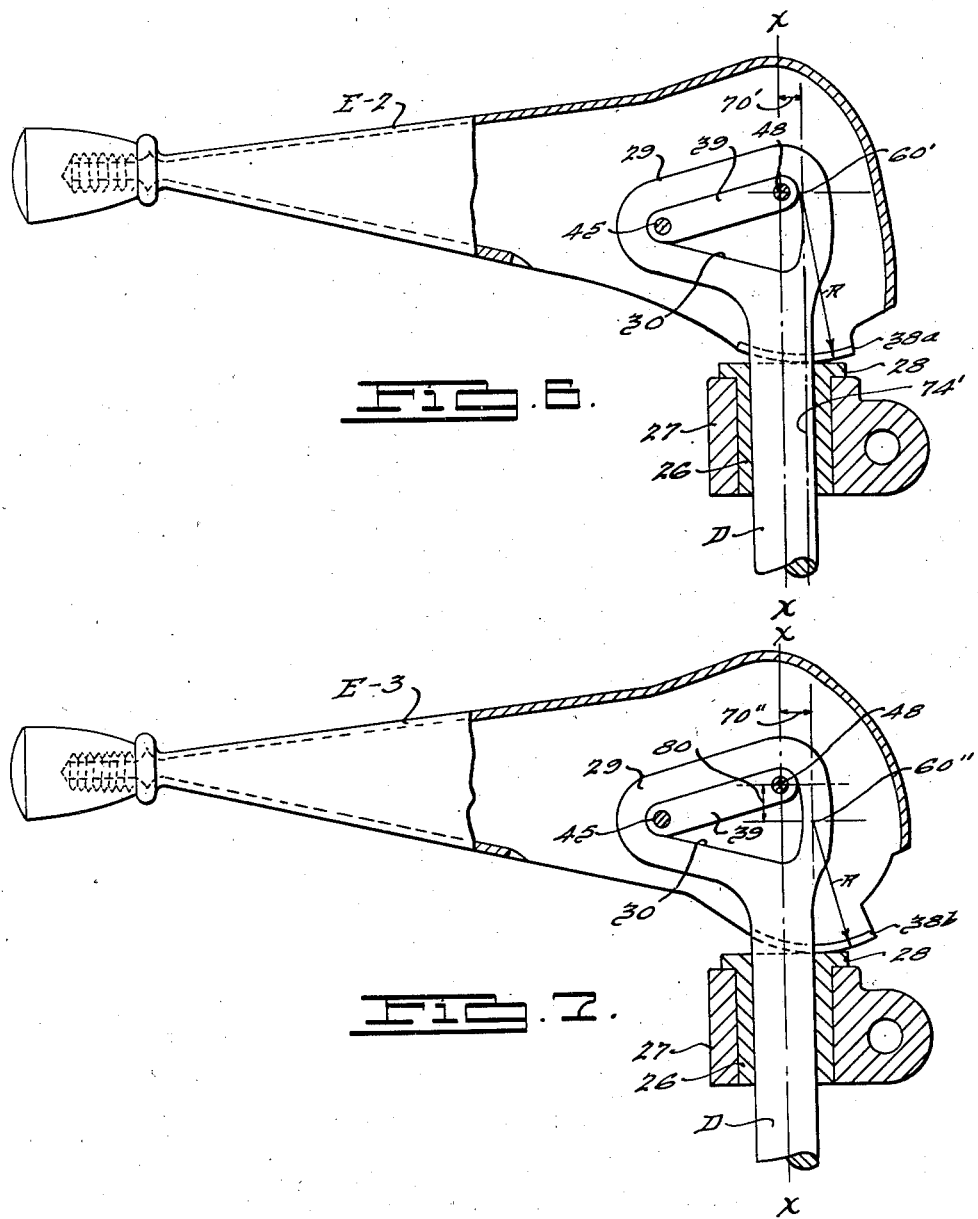
INVENTOR.
Jay C. Auten.
BY
Harness and Harris
ATTORNEYS.

Patented Dec. 16, 1947

2,432,711

UNITED STATES PATENT OFFICE 2,432,711

TRANSMISSION CONTROL MECHANISM

Jay C. Auten, Royal Oak, Mich., assignor to Chrysler Corporation, Highland Park, Mich., a corporation of Delaware Original application April 4, 1945, Serial No. 586,498. Divided and this application February 21, 1946, Serial No. 649,195

8 Claims. (Cl. 74—484)

1

This invention relates to transmission control mechanism and refers more particularly to improvements in transmission remote shift mechanism especially adapted for mounting on motor vehicle steering posts.

This application is a division of my copending application Serial No. 586,498, filed April 4, 1945.

It is an object of my invention to provide a control mechanism capable of being manufactured at lower cost than devices of this general type heretofore known.

Another object is to provide a control which is less likely to rattle than known devices and which will give better service and have longer life, also a control mechanism having improved characteristics of thrust application from the hand lever to the main steering post mounted selector operating control rod.

A further object is to provide an increased mechanical advantage to the selector operating control rod to facilitate easy shifting.

Further objects and advantages of my invention reside in the combination and arrangement of parts hereinafter described and claimed, reference being had to the accompanying drawings in which:

Fig. 1 is a side elevational view of a typical power plant and steering wheel installation for a motor vehicle showing my invention applied thereto;

Fig. 2 is a plan view of the steering wheel and driver operable shift lever as viewed by the vehicle driver;

Fig. 3 is a sectional elevational view through the shift lever and connection to the steering post mounted control rod;

Fig. 4 is a detail sectional plan view taken as indicated by line 4—4 of Fig. 3;

Fig. 5 is a sectional elevational view taken as indicated by line 5—5 of Fig. 3;

Fig. 6 is a view generally similar to Fig. 3 but illustrating a modification of my shift control mechanism; and Fig. 7 is a view generally similar to Fig. 3 but illustrating another modification of my shift control mechanism.

In the drawings I have illustrated my invention in connection with a motor vehicle comprising the well known engine A, clutch B, and any type of transmission C which is adapted to be manipulated at least in part by the vehicle driver. In general, my invention provides improvements in the transmission control mechanism illustrated in the patents to F. W.

2

Slack No. 2,291,111 of July 28, 1941 and O. E. Fishburn No. 2,284,191 of May 28, 1942 and may be employed to advantage in controlling the shift functions of various types of transmissions other than those illustrated in these patents.

My control mechanism is especially adapted for mounting on the conventional steering post 15 below the steering wheel 16, this steering post having its axis inclined forwardly and downwardly from the steering wheel. A main control rod D extends longitudinally adjacent the post 15 and is adapted to select and operate the transmission control elements for forward and reverse speed ratio drives as in the transmissions of the aforesaid patents, for example. When rod D is adjusted from a neutral position in the direction of its axis, such motion is transmitted through any suitable operating connection, such as through the Bowden wire 17, to the transmission selector lever 18. When rod D is rotated about its axis such motion is transmitted through any suitable operating connection, such as through the link and lever system 19, 20, 21, to the transmission lever 22 thereby to operate the transmission speed ratio control element which has been selected by rotary movement of rod D.

Rod D may be suitably guided adjacent its lower end to accommodate its rotary and longitudinal movements as in the yielding bushing 23 rigidly mounted on post 15. Rod D may be assembled downwardly in its bushing mountings. Adjacent its upper end rod D is guided by a bushing 26 which is fixed in a bracket 27 which in turn is fixed to post 15. In Fig. 3 the bushing 26 has a press fit in bracket 27, this bushing having an annular flange 28 at its upper end resting on the upper face of the bracket. As will presently be apparent, the bushing 26 serves as a fixed fulcrum support for the shift lever on the post 15.

At its upper end rod D is formed with a flattened laterally elongated lever-forming head portion 29 slotted at 30 to receive a lever operating and guide means. A shift lever E comprises a hollow steel stamping terminating outwardly in a knob 34 adapted to be grasped by the driver in manipulating lever E. At its inner end, the walls of lever E form a housing for the rod head 29, the sides 35 of the latter slidably engaging the inner side faces of the lever side walls 36 of lever E thereby maintaining the lever against lateral displacement relative to rod D. This housing portion of lever E opens downwardly at 37 above bushing 26 and for providing a slidable fulcrum mounting of lever E on bushing 26, lever fulcruming rockers are carried by the lever. In the Fig. 3 embodiment of my invention these rockers or cams are formed adjacent the lower boundary of opening 37 in the form of the laterally extending support flanges 38 having shift lever supporting faces adapted to bear on the upper face of the bushing flange 28.

In Fig. 3 the rocker flanges 38 are deflected laterally outwardly from the depending side walls 36 of lever E and away from each other, such arrangement permitting these side walls to be fashioned smoothly for a freely fitting engagement with the sides 35 of head 29 as aforesaid and at the same time permitting the rod head 29 to be assembled with lever E by inserting head 29 directly into opening 37 between rockers 38. However, if desired, the rockers 38 may be deflected laterally inwardly toward each other. Rockers 38 are spaced from each other at opposite sides of axis X—X of rod D, the rockers extending in the general direction of the shift lever E so as to intersect a plane through axis X—X transversely to lever E.

The fulcrum point for lever E remains, during operation of the lever, substantially in a plane through axis X—X transverse to the lever. It is desirable to maintain the fulcrum point closely adjacent the rod axis X—X to minimize lateral loads on rod D and this has been accomplished in the accompanying embodiments of my invention.

I have provided means supported between the depending side walls of lever E and cooperating with the slotted formation of the lever head 29 for effecting lift of the rod D in response to lift of lever handle 34 and also for maintaining lever E positioned against undesired displacement in the direction of its length transversely to the axis X—X, this means cooperating with the flanges 38 and fulcrum bushing 26 to guide up and down shifting movements of lever E. In Fig. 3 this means comprises a plate 39 extending between the side walls of lever E and having a flanged head 40 seating externally on one side wall, a companion flanged head 41 seating on the opposite side wall and being secured to the plate 39 by fasteners 42 and 43.

Plate 39 extends through slot 30 which is generally triangular in shape having its apex of cylindrical contour at 44 centered about an axis 45 to rotatably fit the cylindrical end 46 of plate 39. The other end of the plate is likewise cylindrically formed at 47 about an axis 48 for engagement with the base 49 of the slot 30, this being of arcuate formation centered on axis 45.

In the Fig. 3 position of the parts with the lever E in its lowermost neutral position the upper face of plate 39 engages the upper wall or side of the triangular slot 30 and when the lever is fully swingingly raised then the lower face of plate 39 engages the lower wall or side or slot 30, the plane containing the parallel axes 45 and 48 thus sweeping through an angle approximately bisected by a plane normal to axis X—X and containing axis 48. Thus, by preference, the plate 39 is initially downwardly and outwardly inclined so that in lifting lever E the axis 45 moves substantially vertically in applying its lift to rod D with a minimum of side thrust on the rod D. However, if desired, the plate 39 may have an initial position horizontally or at some other inclination.

The curved portion of rocker flanges 38 are of arcuate formation on a radius R about the axis 60 and this axis is offset a distance 70 from axis X—X. The direction of this offset is preferably to one side of a plane transverse to the lever E through axis X—X opposite that side where the lever handle 34 is located. The offset of axis 60 about which rockers 38 are arced, operates when the lever is lifted to swing about axis 60 to increase the lever lift and reduce lever travel over a construction wherein the axis 60 and axis 48 coincide.

During upward swing of lever E from Fig. 3, the lever axis of rotation 48 has an imperceptible displacement laterally of axis X—X as the plate 39 moves perpendicular to axis X—X and the lever is free to so move by slight slip at the fulcrum support 28.

In order to minimize friction between the fixed fulcrum bushing 26 and the lever flanges 38 slidably seated thereon and to provide for an easy noiseless shift of lever E both vertically and horizontally or laterally, I preferably form the bushing, or its lever supporting face, of some metal composition different from that of the lever flanges. Thus in Fig. 3 the bushing 26 is formed by molding and sintering powdered metal or metals of different melting points in a manner now well known in forming porous metal bearings of the self-lubricating type as, by way of example, set forth in patent to C. A. Tea 1,927,619 of September 19, 1933, and to W. G. Calkins et al. 1,927,627 of September 19, 1933. Lubricant may be provided in the form of graphite included in the metal mixture supplemented by or substituted by fluid lubricant absorbed by immersing the bushing in lubricating oil then to be exuded to the fulcrum surface of bushing flange 28.

Following present known arrangements in remote gearshift mechanisms in general use, rod D is preferably biased downwardly at some convenient point or points in the connections of the operating system such as by spring 14. The spring biasing means is described in my copending application Serial No. 586,498 filed April 4, 1945. This serves to maintain lever E in its Fig. 3 neutral downwardly swung position known as the high speed range ready to be rotated forwardly about axis X—X to the position E' in Fig. 2 for forward transmission drive setting or rearward to E'' for forward drive in high. Lever E is lifted in neutral and then moved forward about axis X—X for reverse, or rearward for forward drive in low, this latter position being omitted in some well-known shift arrangements especially where the manual shifts are supplemented by automatic shift function in the transmission.

With lever E in its Fig. 3 neutral position, rod D is biased downward causing head 29 to seat on the upper face of plate 39 thereby forcing the lever E to seat at its flanges 38 on the bushing flange 28 stationarily mounted on the post 15. Rotation of lever E either fore or aft will cause the lever and rod D to rotate as a unit about axis X—X, head 29 fitting the side walls of lever E. During this movement flanges 38 rotatably slidably bear on the bushing flange 28. The lubricant content of the bushing 26 insures the desired freedom of sliding contact at flanges 38 free from noise and undue wear.

When lever E is lifted from the Fig. 3 neutral position, preparatory for a rotational shift in the raised position, flanges 38 wipe across flange 28 at the bushing contact substantially in a plane transversely to the shift lever through axis X—X or closely adjacent thereto as in Fig. 3 while the plate portion at 46 lifts the head 29 until the plate 39 seats on head 29 at the lower portion of slot 30. During this lift, the lever E rotates about axis 48 in providing a mechanical advantage for lifting rod D in the ratio of the effective lengths of lever E and plate 39 from axis X—X. After the lever has been lifted then it is swung about axis X—X. The wiping and rotating movements of flange 38 on flange 28 brings into action at different times the various portions of flanges 38 with the various portions of flange 28 so that there is no tendency to wear a groove in the fulcrum surface of flange 28.

In Fig. 3 the rockers 38 are provided with flat or planar portions 58 parallel with and in face contact with the fulcrum bushing flange 28 to one side of a plane transverse to lever E and containing the axis X—X of rod D while to the other side of this plane the rockers have arcuate portions 59 formed about the lever axis 60.

When lever E is swung about axis X—X, the planar rocker portions 58 rotatably engage the upper face of flange 28 with a substantial flange area in bearing contact. Inasmuch as most of the lever shifting is done in the high range, without lifting the same, this offers a relatively large area of flange contact with the fulcrum bushing 26. When lever E is lifted for the cross-over transmission selection, then flange portion 59 operates to provide a sliding fulcrum support on the bushing, the plate 39 lifting the rod D at 46. When rod D is thus lifted, it is rotated by swinging lever E about axis X—X.

Referring to Fig. 6 the lever E—2 differs from lever E of Fig. 3 in that the curve of rocker flanges 38$^a$ is extended to the whole length of the flange. The planar portion 58 has been omitted and replaced by a curved portion. The rockers 38$^a$ are arced about radius R centered at axis 60' which is offset from axis X—X of rod D by an amount 70'. The direction of this offset is preferably to one side of a plane transverse to the lever E through axis X—X opposite that side where the lever handle 34 is located. In such an arrangement the downward bias of spring 14 on rod D produces a downward force on lever E—2 at 48 along axis X—X. This results in an upward supporting force at bushing flange 28 along axis 74' offset from axis X—X and extending parallel thereto through axis 60'. The resulting couple, which assists the gravity force on the lever tends to bias the lever E—2 counterclockwise as viewed in Fig. 6 causing plate 39 to maintain contact with the head 29 at the top of opening 30. In this manner rattles are prevented as all clearances are taken up and the provision of special anti-rattle washers or springs rendered unnecessary. Furthermore, the offset of axis 60', about which rockers 38$^a$ are arced, operates as in Fig. 3 when the lever is lifted to swing about axis 60 to increase the lever lift and reduce lever travel.

Referring to Fig. 7 I have illustrated a modified rocker formation which may be employed in any of the foregoing shift lever embodiments. In Fig. 7 the shift lever E—3 differs from the lever E in that the fulcruming rockers are shaped differently. These rockers 38$^b$ are, as in the previously described embodiments, carried rigidly by the shift lever. However, in Fig. 7 the rockers 38$^b$ are arced at radius R about an axis 60'' which extends transversely of and closely adjacent to the rod axis X—X and parallel to the axis 48 of upward swing of the shift lever E—3. The axis 60'' is offset a distance 70'' from the rod axis X—X. This axis 60'' is furthermore offset downwardly an amount indicated at 80 from a plane normal to axis X—X through the axis of swing 48. The arcuate formation of rockers 38$^b$ provides the same benefits in connection with the offset at 70'' as have been heretofore set forth in connection with the offset 70 and 70' in Figs. 3 and 6. In addition, the offset 80 of the rocker radius relative to axis 48 operates to negative the effect of the offset 70'' which increases the lever lift and reduces the lever travel for a given rod lift. Obviously the amount of offset at 70'' and 80 may be varied as desired and it will be obvious that either or both of these offsets may be provided in connection with the rocker faces of any of the illustrated embodiments of my invention.

I claim:

1. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column comprising a member fixed relative to the steering column and having an annular fulcrum surface surrounding said rod adjacent said lever opening, means connecting the upper end of said rod with said shift lever for transmitting vertical swinging movements of said shift lever to said rod so as to move said rod in the direction of its axis and for guiding said shift lever for rotational shift about said rod axis during said rotary shifting movements of said shift lever, said shift lever having a pair of rockers rigidly carried thereby in lever-fulcruming engagement with said annular surface, said rockers extending longitudinally of said shift lever along and adjacent opposite sides of said rod and each rocker having at least a portion thereof arced about an axis extending in a direction transverse to said rod axis and another planar portion thereof disposed, in one position of said shift lever, in a plane parallel to and in engagement with said annular surface, said mounting and connecting means cooperating with said rockers such that, in the downwardly swung position of said shift lever, rotational shift of said shift lever about said rod axis causes the said planar portions of said rockers to rotatably wipe said annular friction surface and such that when said shift lever is swung vertically upwardly said arced rocker portions slidably wipe said annular friction surface and fulcrum said lever for effecting lift of said rod.

2. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column comprising a member fixed relative to the steering column and having an annular fulcrum surface surrounding said rod adjacent said lever opening, means connecting the upper end of said rod with said shift lever for transmitting vertical swinging movements of said shift lever to said rod so as to move said rod in the direction of its axis and for guiding said shift lever for rotational shift about said rod axis during said rotary shifting movements of said shift lever, said shift lever having a pair of rockers rigidly carried thereby in lever-fulcruming engagement with said annular surface, said rockers extending generally longitudinally of said shift lever along and adjacent opposite sides of said rod and each rocker having at least a portion thereof arced about an axis extending in a direction transverse to said rod axis and offset therefrom to one side of a plane normal to the axis of said shift lever passing through said axis, said mounting and connecting means cooperating with said rockers such that when said shift lever is rotatably shifted about said rod axis the said rockers rotably wipe said annular friction surface and such that when said shift lever is swung vertically upwardly said rockers slidably wipe said annular friction surface and fulcrum said shift lever for effecting lift of said rod.

3. In a steering column mounted control mechanism for selectively operating speed ratio controls of a motor vehicle transmission, a main rotatable and reciprocatory control rod having its axis extending generally longtudinally of the steering column and adapted for operative connection with the transmission, said rod having its upper end provided with a lever portion rigidly connected to said rod and offset laterally therefrom, a shift lever having a driver operable end portion and an opposite hollow end portion formed with bounding side walls each having a fulcruming rocker carried thereby, said rockers extending generally longitudinally of said shift lever and being spaced from each other in a direction transversely of said shift lever, said rod extending upwardly through the space between said rockers and having its said lever portion disposed within said hollow portion of said shift lever, means operably connecting said offset end of said rod to said shift lever for effecting axial and rotating movements of said rod respectively in response to vertical swinging and lateral shifting movements of said shift lever, a fulcrum mounted on the steering column, and means biasing said rod and shift lever downwardly to maintain said rockers engaged with said fulcrum during said swinging and shifting movements of said shift lever, said connecting means between said offset end of said rod and said shift lever being so constructed and arranged as to pivotally guide said shift lever for vertical swinging movement about an axis extending transversely to and approximately intersecting said rod axis, said rockers being so disposed as to intersect a plane extending transversely to said shift lever and containing said rod axis, said outer end portion of said lever being disposed to one side of said plane, each of said rockers having a shift lever supporting face slidably engageable with said fulcrum and disposed, prior to upward swinging movement of said shift lever, to the side of said plane opposite to that aforesaid, said rocker faces being arced about an axis disposed substantially parallel to said axis of swinging movement of said shift lever and offset therefrom in the direction of the last said side of said plane.

4. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having a driver operable end portion and an opposite hollow end portion formed with bounding side walls each having a fulcruming rocker carried thereby, said rockers extending generally longitudinally of said shift lever and being spaced from each other in a direction transversely of said shift lever, said rod extending upwardly through the space between said rockers and having its said lever portion disposed within said hollow portion of said shift lever, means operably connecting said offset end of said rod to said shift lever for effecting axial and rotating movements of said rod respectively in response to vertical swinging and lateral shifting movements of said shift lever, a fulcrum mounted on the steering column, and means biasing said rod and shift lever downwardly to maintain said rockers engaged with said fulcrum during said swinging and shifting movements of said shift lever, said connecting means between said offset end of said rod and said shift lever being so constructed and arranged as to pivotally guide said shift lever for vertical swinging movement about an axis extending transversely to and approximately intersecting said rod axis, said rockers being so disposed as to intersect a plane extending transversely to said shift lever and containing said rod axis, said outer end portion of said lever being disposed to one side of said plane, each of said rockers having a shift lever supporting face slidably engageable with said fulcrum and disposed, prior to upward swinging movement of said shift lever, to the side of said plane opposite to that aforesaid, said rocker faces, prior to upward swinging movement of said shift lever, having an engagement with said fulcrum limited substantially to a plane substantially parallel with the first said plane and offset therefrom.

5. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having a driver operable end portion and an opposite hollow end portion formed with bounding side walls each having a fulcruming rocker carried thereby, said rockers extending generally longitudinally of said shift lever and being spaced from each other in a direction transversely of said shift lever, said rod extending upwardly through the space between said rockers and having its said lever portion disposed within said hollow portion of said shift lever, means operably connecting said offset end of said rod to said shift lever for effecting axial and rotating movements of said rod respectively in response to vertical swinging and lateral shifting movements of said shift lever, a fulcrum mounted on the steering column, and means biasing said rod and shift lever downwardly to maintain said rockers engaged with said fulcrum during said swinging and shifting movements of said shift lever, said connecting means between said offset end of said rod and said shift lever being so constructed and arranged as to pivotally guide said shift lever for vertical swinging movement about an axis extending transversely to and offset from said rod axis, said rockers being so disposed as to intersect a plane extending transversely to said shift lever and containing said rod axis, said outer end portion of said lever being disposed to one side of said plane, each of said rockers having a shift lever supporting face comprising a planar portion disposed to said side of said plane and engaging said fulcrum prior to upward swinging movement of said shift lever, and a second portion which, prior to upward swinging movement of said shift lever, is disposed to the side of said plane opposite to that aforesaid and which curves upwardly out of engagement with said fulcrum.

6. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having a driver operable end portion and an opposite hollow end portion formed with bounding side walls each having a fulcruming rocker carried thereby, said rockers extending generally longitudinally of said shift lever and being spaced from each other in a direction transversely of said shift lever, said rod extending upwardly through the space between said rockers and having its said lever portion disposed within said hollow portion of said shift lever, means operably connecting said offset end of said rod to said shift lever for effecting axial and rotating movements of said rod respectively in response to vertical swinging and lateral shifting movements of said shift lever, a fulcrum mounted on the steering column, and means biasing said rod and shift lever downwardly to maintain said rockers engaged with said fulcrum during said swinging and shifting movements of said shift lever, said connecting means between said offset end of said rod and said shift lever being so constructed and arranged as to pivotally guide said shift lever for vertical swinging movement about an axis extending transversely to and offset from said rod axis, said rockers being so disposed as to intersect a plane extending transversely to said shift lever and containing said rod axis, said outer end portion of said lever being disposed to one side of said plane, each of said rockers having a shift lever supporting face slidably engageable with said fulcrum and disposed, prior to upward swinging movement of said shift lever, to the side of said plane opposite to that aforesaid, said rocker faces being arced about an axis disposed substantially parallel to said axis of swinging movement of said shift lever and offset therefrom in the direction of the last said side of said plane, and being also disposed below a plane normal to said rod axis and containing said axis of swinging movement of said shift lever.

7. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column comprising a member fixed relative to the steering column and having an annular fulcrum surface surrounding said rod adjacent said lever opening, means connecting the upper end of said rod with said shift lever for transmitting vertical swinging movements of said shift lever to said rod so as to move said rod in the direction of its axis and for guiding said shift lever for rotational shift above said rod axis during said rotary shifting movements of said shift lever, said shift lever having a rocker surface rigidly carried thereby in lever-fulcruming engagement with said annular surface, said rocker surface extending generally longitudinally of said shift lever and said rocker surface having at least a portion thereof arced about an axis extending in a direction transverse to said rod axis and offset therefrom to one side of a plane normal to the axis of said shift lever passing through said axis, said mounting and connecting means cooperating with said rocker surface such that when said shift lever is rotatably shifted about said rod axis the said rocker surface rotatably wipes said annular friction surface and such that when said shift lever is swung vertically upwardly said rocker surface slidably wipes said annular friction surface and fulcrums said shift lever for effecting shift of said rod.

8. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column, a fulcrum surface substantially perpendicular to said rod, a cooperating rocker surface in lever-fulcruming engagement with said fulcrum surface, one of said surfaces being rigidly fastened to said steering column, the other of said surfaces being carried by the shift lever, means connecting the upper end of said rod with said shift lever for transmitting vertical swinging movements of said shift lever to said rod so as to move said rod in the direction of its axis and for guiding said shift lever for rotational shift about said rod axis during said rotary shifting movements of said shift lever, said rocker surface extending generally longitudinally of said shift lever and said rocker surface having at least a portion thereof arced about an axis extending in a direction transverse to said rod axis and offset therefrom to one side of a plane normal to the axis of said shift lever passing through said axis, said mounting and connecting means cooperating with said rocker surface such that when said shift lever is rotatably shifted about said rod axis the said rocker surface rotatably wipes said annular friction surface and such that when said shift lever is swung vertically upwardly said rocker surface slidably wipes said annular friction surface and fulcrums said shift lever for effecting shift of said rod.

JAY C. AUTEN.

REFERENCES CITED

The following references are of record in the file of this patent:

UNITED STATES PATENTS

| Number | Name | Date |
| --- | --- | --- |
| 2,182,252 | Dolza et al. | Dec. 5, 1939 |
| 2,235,975 | Best | Mar. 25, 1941 |
| 2,303,787 | Burd | Dec. 1, 1942 |
| 2,324,732 | Slack | July 20, 1943 |